(12) United States Patent
Mohamed et al.

(10) Patent No.: US 6,925,438 B2
(45) Date of Patent: Aug. 2, 2005

(54) METHOD AND APPARATUS FOR PROVIDING AN ANIMATED DISPLAY WITH TRANSLATED SPEECH

(75) Inventors: Magdi A. Mohamed, Schaumburg, IL (US); Mark A. Tarlton, Barrington, IL (US); George T. Valliath, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 39 days.

(21) Appl. No.: 10/266,222

(22) Filed: Oct. 8, 2002

(65) Prior Publication Data

US 2004/0068410 A1 Apr. 8, 2004

(51) Int. Cl.[7] .............................................. G10L 21/06
(52) U.S. Cl. ........................ 704/276; 704/277; 704/2; 704/3; 704/260; 345/767; 345/473
(58) Field of Search ................................ 704/276, 277, 704/2, 3, 260; 345/767, 473

(56) References Cited

U.S. PATENT DOCUMENTS

| | | |
|---|---|---|
| 4,975,960 A | 12/1990 | Petajan |
| 5,175,684 A | 12/1992 | Chong |
| 5,497,319 A | 3/1996 | Chong et al. |
| 5,741,136 A * | 4/1998 | Kirksey et al. ............. 434/169 |
| 5,771,306 A | 6/1998 | Stork et al. |
| 6,028,960 A | 2/2000 | Graf et al. |
| 6,181,351 B1 * | 1/2001 | Merrill et al. ............... 345/473 |
| 6,272,231 B1 | 8/2001 | Maurer et al. |
| 6,307,589 B1 | 10/2001 | Maquire et al. |
| 6,359,601 B1 | 3/2002 | Maguire et al. |
| 6,449,595 B1 | 9/2002 | Arslan et al. |
| 6,504,546 B1 | 1/2003 | Cosatto et al. |
| 2002/0010584 A1 * | 1/2002 | Schultz et al. .............. 704/270 |
| 2002/0135618 A1 * | 9/2002 | Maes et al. .................. 345/767 |
| 2003/0028380 A1 * | 2/2003 | Freeland et al. ............ 704/260 |
| 2003/0046082 A1 * | 3/2003 | Siegel ......................... 704/270 |

* cited by examiner

Primary Examiner—Richemond Dorvil
Assistant Examiner—Qi Han
(74) Attorney, Agent, or Firm—Fitch Even Tabin and Flannery

(57) ABSTRACT

A first language to second language translator (11) converts text comprising a message in a first language into text representing that message in a second language. A text to speech transducer (12) then synthesizes an audiblized version of the text in the second language. An animated display driver (14) creates a corresponding display (15) of an image (16) that includes a mouth (17) that moves appropriately and synchronously with respect to the audiblized second language. In other embodiments, other facial features can be animated as well. Such animation can be random and unrelated to the appearance of the original speaker. Or, such animation can accurately represent at least some alterations to facial features of the original speaker while speaking. In some embodiments, the facial features can be altered by correlating specific detected alterations with specific corresponding substantive content in the original message and the translated text.

15 Claims, 3 Drawing Sheets

ORIGINAL IMAGE "AH"

ALTERED IMAGE "OH"

ORIGINAL IMAGE
"AH"

ALTERED IMAGE
VERSION 1
"OH"

ALTERED IMAGE
VERSION 2
"OH"

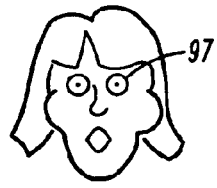
WHEN HE CAME INTO THE ROOM WITH THAT HAT, I THOUGHT HE HAD MADE A BIG MISTAKE
FIG. 9
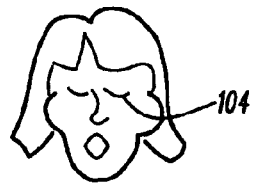
WATASHI WA KARE GA ANO BOSHI WO MOTTE HEYA NI HAITTA TOKI, KARE GA OKINA
FIG. 10
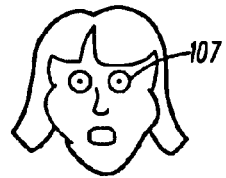
MACHIGAI WO SHITA TO OMOIMASHITA

METHOD AND APPARATUS FOR PROVIDING AN ANIMATED DISPLAY WITH TRANSLATED SPEECH

TECHNICAL FIELD

This invention relates generally to communications and more particularly to the presentation of translated speech.

BACKGROUND

Various processes exist to facilitate verbal communications. For example, it is known to automatically recognize audible speech content and convert that audible content to corresponding text. It is also known to be able to take text and audiblize the text using synthesized speech techniques. Other known proposed enhancements to verbal communications include the corresponding presentation of a view of the speaker on a display.

At present there are dozens of primary spoken languages used in ordinary human discourse and hundreds (if not thousands) of spoken languages and dialects that find constant albeit less popular use. The existence of such a variety of languages of course constitutes an impediment to ease of communications between individuals. Such individuals must either identify a common language that both can understand or they must locate an intermediary who can translate their communications for the benefit of the other. More recently, it is known to be able to automatically convert text in a first language into text in a different language to thereby at least facilitate written communications under such circumstances.

There are many times when the potential benefits of audiblized communications between individuals who do not share a common language are desired. There are also many times when it would be beneficial to augment such audiblized communications with a corresponding graphic display featuring, for example, a displayed speaker. Unfortunately, present platforms and suggested solutions do not present a fully satisfactory result in this regard.

BRIEF DESCRIPTION OF THE DRAWINGS

The above needs are at least partially met through provision of the method and apparatus for providing an animated display with translated speech described in the following detailed description, particularly when studied in conjunction with the drawings, wherein:

FIG. 9 comprises a schematic depiction of an original speech utterance in English with corresponding facial expressions; and FIG. 10 comprises a schematic depiction of a translated speech utterance in Japanese with corresponding facial expressions in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a suitable platform translates text that corresponds to a first audiblizable language into text that corresponds to a different, second audiblizable language. While then rendering that resultant text as audible sounds the platform provides a visual representation of at least a mouth that moves in substantial synchronism with the audible spoken sounds in the second language. In one embodiment, speech recognition techniques are used to provide the text that corresponds to the first audiblizable language.

In a preferred embodiment, the visual representation includes at least a face having a mouth. The face can correspond to the original speaker if desired. In one embodiment, other facial features are altered during provision of the audible sounds. If desired, alteration of such facial features can match corresponding facial feature alterations of the original speaker. In one embodiment, such alterations can be correlated to specific speech substantive content as occurred during the original speech utterance. Candidate facial features for such alteration include eyes (or parts thereof), eyelids, eyebrows, cheeks, the nose (or a part thereof), the forehead, ears, and the chin, to name a few. The alterations can include, for example, movement of the facial feature and/or changes in coloration.

So configured, a recipient can view the image of another person seemingly speaking in a language that is understood by the recipient. The mouth of the image will appear to move substantially synchronously and appropriately in accord with the audiblized speech. In addition, in an appropriate embodiment, other facial features of the speaking image can change as well (to reflect or impart, for example, similar alterations as appear on the face of the original speaker) to thereby convey a more natural appearance and/or potentially valuable non-verbal communications.

Figure 1:
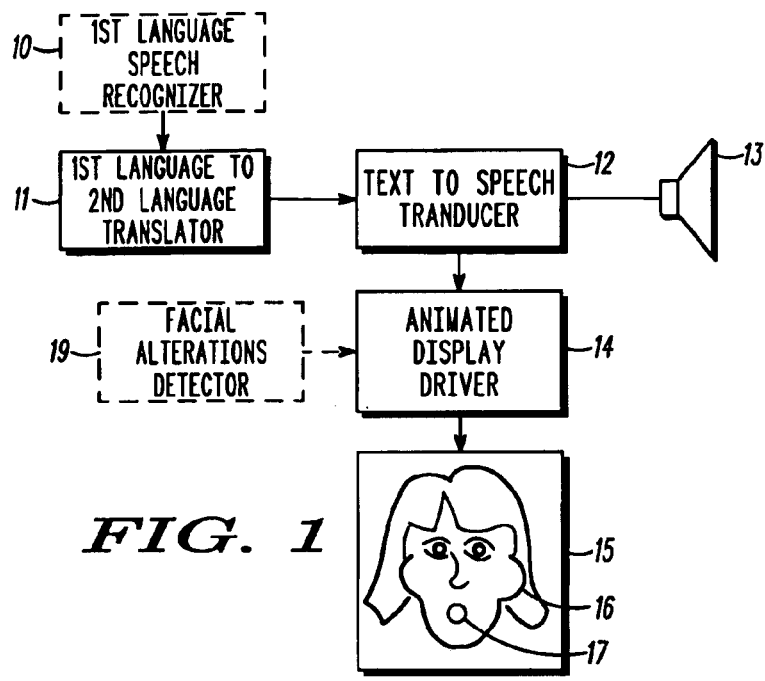
FIG. 1 comprises a block diagram as configured in accordance with an embodiment of the invention.

Referring now to the drawings, and particularly to FIG. 1, a general platform 10 for effecting such processes will be described. A first language to second language translator 11 serves to translate a textual communication in a first language, such as English or German, into corresponding text in second language, such as Malay or Korean. Such translators are known in the art and operate in various ways to achieve a reasonably accurate translation. Typically, such translators are comprised of programmable platforms that support task-specific software that is designed to effect the translation using a given translation methodology of choice. In a preferred embodiment, to facilitate substantially real time communications, the translator 11 will comprise a substantially real time translation engine as is also well known and understood in the art.

The translated text output of the first language to second language translator 11 couples to a text to speech transducer 12. Such transducers are also well known in the art and also typically comprise a programmable platform bearing one or more software applications that serve to associate text with corresponding sounds of speech and to then synthesize a resultant audio stream comprising such sounds. A preferred approach includes parsing the text to a sufficient degree to permit associating individual phonemes with the parsed textual elements. Such phonemes are typically viewed as constituting the basic elements of vocalized speech and therefore serve as a useful building block for synthesizing verbalized speech that corresponds realistically and accurately to the source text. Various approaches exist to facilitate appropriate pronunciation and enunciation of synthesized speech, including contextually-based pronunciation rules. In general, any of these known approaches will serve compatibly for the purposes of the present embodiment. Again, when supporting a real time communication, the text to speech transducer 12 will preferably comprise a substantially real time speech synthesis platform.

A speaker 13 serves to physically convert the synthesized speech electric audio signals from the text to speech transducer 12 into physical sound waves to thereby render the synthesized speech audible. (Depending upon the application and embodiment, of course, other elements may be introduced as well, such as independent audio amplifiers, compressors, equalizers, and the like.)

This embodiment also includes an animated display driver 14 and a corresponding display 15. The animated display driver 14 serves to provide a display of at least an animated mouth 17 and preferably the entire face 16 of an individual on the display 15. Depending upon the application and/or the specific embodiment, the animated display driver 14 can work with source data that comprises a live image (still or dynamic) of a person, a partially live (still or dynamic) and partially virtual image (still or dynamic) of a person, or a fully virtual still or dynamic image of a person. Also as desired, the image 16 portrayed can be a faithful representation of the actual person speaking (either as a live image or as a previously stored or rendered image) or can comprise the image of another person (either real or fanciful). The source data can further comprise either a two dimensional rendering of the person or a three dimensional rendering. Depending upon the embodiment, the source image data can be previously stored at the animated display driver 14 (or convenient thereto) or can be provided to the animated display driver 14 as needed or as obtained during the process described herein (the latter may occur, for example, when the animated display driver 14 resides in a receiving communication device such as a videophone and a corresponding wireless transmitter provides the source data along with a verbal communication).

The animated display driver 14 serves, at least in part, to animate the mouth 17 of the image 16 to move synchronously with pronunciation of the audiblized second-language translated text. More particularly, the animation will preferably cause the mouth to appear to be correctly speaking the audiblized second-language text. Appropriate software programs exist that serve the purpose of animating a mouth to realistically accord with a given recitation of audiblized speech. Such animation can be based upon relatively lengthy audiblized segments (such that a single animated movement or shape of the mouth will serve to represent a number of corresponding individual audible sounds) but will preferably be rendered on a phoneme by phoneme basis. By combining a source facial image 16 with such an animated mouth 17, a relatively realistic depiction can result.

Pursuant to one embodiment, such animation can be achieved through use of a 3-dimensional model of the subject head that includes a graphical representation (typically expressed as a collection of nodes and links that collectively describe the geometry of the speaker's head in addition to texture maps that express color information for the subject of interest) thereof. The creation and specification of such models, including specifically models of the human head, are well known and understood in the art. Similar parameters are then monitored on the visage of the speaker's face. The resultant detected parameters are then readily usable to reform the 3-dimensional head model (including by movement of appropriate nodes and alteration of corresponding texture maps) to reflect and conform to such detected parameters. For example, shadows and other lighting effects that result due to movement of the speaker's head, and color alterations (due to, for example, blushing) are readily captured and rendered in such a fashion. Furthermore, such 3-dimensional models are suitable to facilitate the rendering of both flat images (i.e., without depth information) and so-called stereo images wherein an image is provided to each eye of the viewer to permit the perception of depth information.

Figure 2:
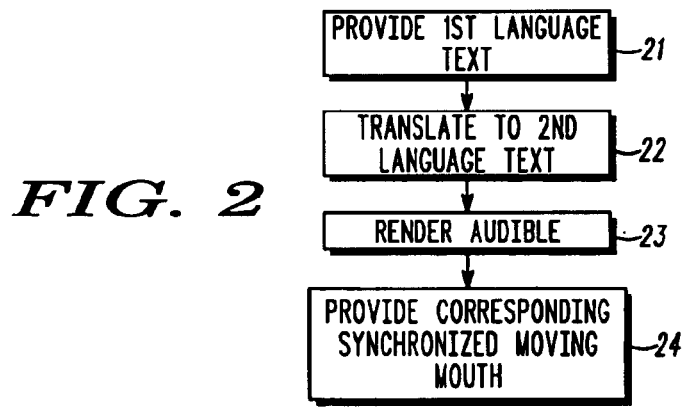
FIG. 2 comprises a flow diagram as configured in accordance with an embodiment of the invention.
Figure 3:
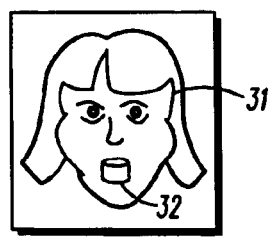
FIGS. 3 through 7 comprise various depictions of original and altered images as configured in accordance with an embodiment of the invention.
Figure 4:
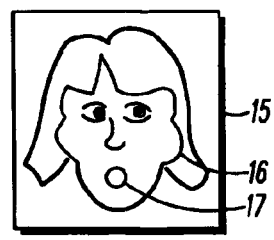

So configured, and referring now to FIG. 2, such a platform will serve to provide 21 text in a first language and to translate 22 that text into corresponding text in a second language. That text will then be rendered 23 audible (using, for example, synthesized speech techniques) while simultaneously providing 24 a depiction of a mouth that moves synchronously with the audiblized speech in the second language. In effect, the displayed speaker 16 will appear to be speaking in the second language notwithstanding that the original speaker actually spoke in a different original language.

As already suggested, the displayed facial image can be as accurate or fanciful, and as detailed or broadly rendered, as desired for a given application. The facial image can be that of the original speaker or can offer a different visage. And, to the extent that the display presents an image of the original speaker, the actual image displayed can be that of the original speaker as that person speaks or of a fully virtual avatar. With any of these choices, the synchronously moving mouth lends a pleasing and appropriate sense to the image as it accompanies the verbalized message.

In the embodiments described above, the text in the original first language can be provided in the first instance as just that—text. If desired, however, a first language speech recognizer 18 will receive a speech input in the first language and recognize the individual words spoken to effect the provision of corresponding text in the first language at an output thereof. Various speech recognition platforms are well known in the art. Some are based substantially on sound analysis alone while other approaches incorporate contextual analysis to potentially improve upon the accuracy of the recognition process. All of these approaches are compatible for use in these embodiments. Use of such a speech recognizer 18 will facilitate real time use of these embodiments to enable, for example, a two-way video communication via a communication medium of choice.

As described, the displayed mouth will move appropriately and synchronously with respect to the audiblized speech in the second language. In many instances, however, such movements alone may not suffice to present a fully convincing image of a person conversing. If desired, some degree of alteration to various facial features can be effected on a fully random basis. In the alternative, one or more facial features can be altered synchronously or asynchronously with respect to one or more trigger events (such as the length of the original message, the identity of the speaker or the listener, the substantive content of the message, and so forth). For example, the eyes can be caused to blink from time to time and/or the head itself can be moved with respect to pitch and yaw to mimic general human movements while speaking.

While such facial alterations may lend an increased sense of reality to the displayed image, for some applications the inherent falsity of these movements may be inappropriate. Instead, it may be desired to present facial alterations that accord with actual facial alterations as evinced by the original speaker when audiblizing the original message. To accommodate such a need, a facial alterations detector 19 as shown in FIG. 1 can be used to gather information regarding one or more monitored facial alterations and to inform the animated display driver 14 of such alterations to permit incorporation of at least some of those alterations in the rendered image. Depending upon the desired end result, such a detector 19 can monitor alterations to one or more specific facial areas with respect to movement (as occurs with respect to changes in position or shape) and/or coloration. There are various known facial alteration detectors 19 that will work compatibly in this application. For example, eye monitors are well known that will track gaze direction and/or dilation of the pupil. Video imaging platforms are also well known that can specifically track alterations to facial features. Furthermore, a number of known approaches exist for parameterizing such facial alterations. Pursuant to many such approaches, various key facial locations are identified and assigned a corresponding identifier. Changes to this identifier can then be represented with one or more numerical values. With such an approach, a significant number of facial features can be simultaneously monitored and changes to such features parameterized and provided to the animated display driver 14 for appropriate subsequent use when forming the displayed image 16.

Figure 5:
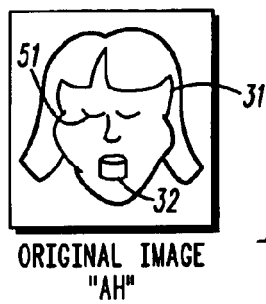
Figure 6:
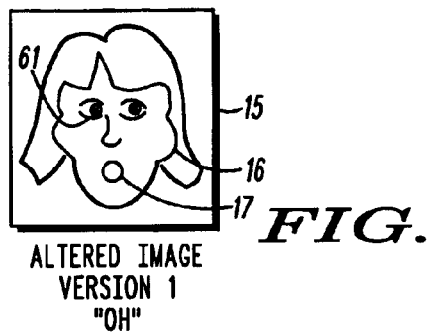
Figure 7:
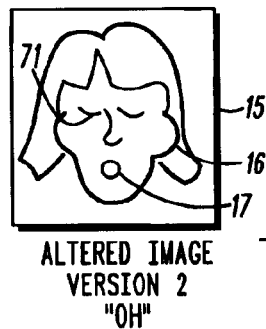
Figure 8:
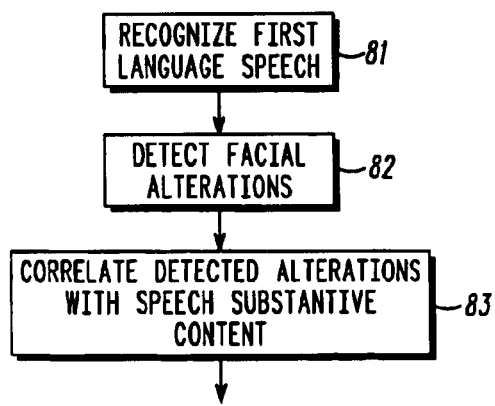
FIG. 8 comprises a detailed flow diagram as configured in accordance with another embodiment of the invention.

To illustrate, a speaker 31 as depicted in FIG. 5 may, for example, blink their eyes 51 while speaking. In this example, the speaker 31 has blinked while sounding the expression "ah" in a first language. Pursuant to these various embodiments, if the translation of this expression "ah" in the first language yields the expression "oh" in a desired second language, the mouth 17 of the resultant formed image 16 is properly formed as illustrated in FIG. 6 to appear as though sounding the vocalized "oh." The eyes 61 of this image, however, without other processing, are open and hence do not coordinate with the blink as occurred during the original message. Pursuant to another embodiment, however, as described above, the blink can be detected during the original message and that information then used to animate a corresponding blink 71 for the constructed image 16 as illustrated in FIG. 7. So configured, any number of facial features can be tracked and dynamic modifications of such features as occur during the original message can be replicated through animation of the constructed image as provided to accompany the audiblization of the translated message.

Such an embodiment can be used alone or in conjunction with artificially-added feature alteration as may be desired for the purposes of a given application. In addition, if desired, alterations to some monitored features can be squelched or muted. For example, a given individual may not object to the detection and usage of a blink, but may not wish a longer incident of eye-closure to be noted in the same way. Such selective filtering can be made as general or as specific as may be appropriate to a given application.

The above embodiments may be sufficient to provide a convincing and appropriate visual image when translating a number of source languages into any number of resultant languages. Some languages, however, differ considerably from one another with respect to, for example, grammatical syntax. The relative placement of nouns and verbs, adjectives and nouns, and subject and predicate, for example, can be considerably different as between two languages. In such a case, the use of monitored feature alterations can raise potential issues. For example, a knowing blink that occurs at a specific time during a message in a first language may occur at a confusing or inappropriate time during the audiblization of the translated message because the blink is no longer associated with the same substantive content of the message.

Therefore, pursuant to another embodiment, detected alterations of at least a portion of the face of a speaking individual are correlated with specific substantive content within the original spoken message. This correlation is then used to control how and when to animate the displayed image to reflect the detected alteration in combination with audiblization of the specific substantive content when imparted through the audiblization of the translated message.

To illustrate this approach, consider a sentence in a first language, English, as schematically presented in FIG. 9. While a speaker verbalizes the sentence 91, "When he came into the room with that hat, I thought he had made a big mistake," the speaker blinks 92 when verbalizing the word "came" 92 and opens their eyes 97 wide when saying, "mistake" 95. Through the processes described above, this sentence in English is translated into a second language, Japanese, as the sentence 101, "Watashi wa kare ga ano boshi wo motte heya ni haitta toki, kare ga okina machigai wo shita to omoimashita." In this translation, the Japanese word "haitta" 102 best correlates substantively with the English word "came" 92 as occurred in the original statement. When presenting the accompanying image, then, in addition to animating the mouth 103 to appear appropriately formed for the sounds that constitute this word in Japanese, a blink 104 is also provided to reflect the original speaker's blink 94 when speaking the word in the original sentence having the same substantive meaning. Similarly, the Japanese word "machigai" 105 best substantively correlates with the English word "mistake" 95, and hence the image display as accompanies verbalization of the word "machigai" 105 has the wide open eyes 107 as portrayed by the speaker when originally speaking the originally substantively correlated word "mistake" 95.

So configured, the displayed image as accompanies a verbalized message in a non-original language can include both a mouth that moves in an appropriate and convincing fashion in synchronism with the audiblized message and other facial features that are altered both to conform to how the original speaker appeared when speaking and at the time of conveying the same corresponding substantive content. The individual platform elements of these embodiments are all well known in the art and can be realized in a variety of ways through use of dedicated hardware platforms and/or programmable platforms as appropriate to a given application. In addition, these embodiments can be used to facilitate a wide variety of purposes, including for example two-way video conferencing (both wired and wireless platforms), dubbing video presentations such as movies into another language, and various point to multi-point broadcasts including webcasts.

Those skilled in the art will recognize that a wide variety of modifications, alterations, and combinations can be made with respect to the above described embodiments without departing from the spirit and scope of the invention. For example, selection of a specific head model (including either an avatar or a specific actor) can be made either automatically or manually as appropriate to a given application. When automating this selection process, a variety of input criteria can be utilized to permit selection of an appropriate head model. For example, automatic face recognition, iris recognition, gender recognition, age estimation, race recognition, speaker verification, and/or spoken/written language identification can all be used to better inform the automatic selection of a particular head model for use as described herein. Such modifications, alterations, and combinations are to be viewed as being within the ambit of the inventive concept.

We claim:

1. A method comprising:
capturing speech in a first language being uttered by a person having a face;
detecting alteration of at least a part of the face, other than a movement of a mouth, and correlating such alteration to specific words in the speech to provide detected alterations converting the speech into text;
translating the text into a second language that is different from the first language to provide translated speech;
rendering the translated speech audible to provide audiblized translated speech;
while rendering the translated speech audible, substantially synchronously providing a display of at least an animated representation of the face wherein:
the face has a mouth that moves synchronously with the audiblized translated speech; and
the face has at least one other part that is altered synchronously with the detected alteration;
such that the at least animated representation of the face presents a mouth that moves in substantial accord with the audiblized translated speech and at least one part of the face that is altered in substantive accord with facial alterations as evinced by the person when uttering the speech.

2. The method of claim 1 wherein synchronously altering the at least one other part includes altering the at least one other part during a particular part of the audiblized translated speech in a way that is at least substantially similar to a detected alteration that correlates to the specific words having substantive content that substantially matches the particular part of the audiblized translated speech.

3. The method of claim 2 and further including identifying at least one category of facial alteration and wherein substantially synchronously providing a display of at least an animated representation of the face includes not altering the animated representation of the face to mimic the at least one category of facial alteration.

4. The method of claim 1 wherein detecting alteration of at least a part of the face includes detecting alteration of at least one of an eye, a part of an eye, an eyelid, an eyebrow, a cheek, a nose, a part of a nose, a forehead, an ear, and a chin.

5. The method of claim 1 wherein providing a display of at least an animated representation of the face includes providing a display of at least an animated three-dimensional representation of the face.

6. The method of claim 1 wherein rendering the translated speech audible includes selecting from amongst a plurality of synthesized speech voices.

7. The method of claim 1 wherein providing a display of at least an animated representation of the face wherein the face has a mouth that moves synchronously with the translated speech includes moving the mouth, at least from time to time, on a phoneme by phoneme basis with the audiblized translated speech.

8. A method comprising:
capturing speech in a first language being uttered by a person having a face;
detecting alteration of at least a part of the face, other than a movement of a mouth, and correlating such alteration to specific words in the speech to provide detected alterations converting the speech into text;
translating the text into a second language that is different from the first language to provide translated speech;
rendering the translated speech audible to provide audiblized translated speech;
while rendering the translated speech audible, providing a display of at least an animated representation of a second face wherein:
the second face has a mouth that moves synchronously with the audiblized translated speech; and
the second face has at least one other part that is altered synchronously with the detected alteration;
such that the animated representation of the second face presents a mouth that moves in substantial accord with the audiblized translated speech and the at least one other part of the second face is altered in substantive accord with facial alterations as evinced by the person when uttering the speech and in correlation to specific words in the audiblized translated speech having substantive content that substantially matches the specific words in the speech to which the facial alterations are correlated.

9. The method of claim 8 and further including identifying at least one category of facial alteration and wherein providing a display of at least an animated representation of the second face includes not altering the animated representation of the face to mimic the at least one category of facial alteration.

10. The method of claim 8 wherein detecting alteration of at least a part of the face includes detecting alteration of at least one of an eye, a part of an eye, an eyelid, an eyebrow, a cheek, a nose, a part of a nose, a forehead, an ear, and a chin.

11. The method of claim 8 wherein the display of at least the animated representation of the second face does not correspond to the face of the person uttering the speech in the first language.

12. The method of claim 8 wherein the display of at least the animated representation of the second face does correspond to the face of the person uttering the speech in the first language.

13. The method of claim 8 wherein providing a display of at least an animated representation of the second face includes providing a display of at least an animated three-dimensional representation of the face.

14. The method of claim wherein rendering the translated speech audible includes selecting from amongst a plurality of synthesized speech voices.

15. The method of claim 8 wherein providing a display of at least an animated representation of the second face wherein the second face has a mouth that moves with the translated speech includes moving the mouth, at least from time to time, on a phoneme by phoneme basis with the audiblized translated speech.

\* \* \* \* \*